(12) United States Patent
Watkins

(10) Patent No.: US 9,014,968 B2
(45) Date of Patent: Apr. 21, 2015

(54) COMMUTER ROUTE LEARNING

(75) Inventor: Gary A. Watkins, Berkley, MI (US)

(73) Assignee: General Motors LLC, Detroit, MI (US)

(*) Notice: Subject to any disclaimer, the term of this patent is extended or adjusted under 35 U.S.C. 154(b) by 1914 days.

(21) Appl. No.: 11/864,262

(22) Filed: Sep. 28, 2007

(65) Prior Publication Data

US 2009/0088973 A1  Apr. 2, 2009

(51) Int. Cl.
- *G01C 21/00* (2006.01)
- *G08G 1/123* (2006.01)
- *G01C 21/36* (2006.01)
- *G01S 19/39* (2010.01)

(52) U.S. Cl.
CPC ............ *G01C 21/3691* (2013.01); *G01S 19/39* (2013.01)

(58) Field of Classification Search
USPC .......................... 701/200–226, 25, 400–541; 340/984–996; 382/104; 348/113, 118, 348/119

See application file for complete search history.

(56) References Cited

U.S. PATENT DOCUMENTS

| | | | | |
|---|---|---|---|---|
| 6,961,758 B2* | 11/2005 | Krishnan | ........................ | 709/217 |
| 2005/0273255 A1* | 12/2005 | Watkins et al. | ............... | 701/210 |
| 2006/0149461 A1* | 7/2006 | Rowley et al. | ................ | 701/202 |
| 2006/0265124 A1* | 11/2006 | Ohler | ............................. | 701/209 |
| 2007/0010942 A1* | 1/2007 | Bill | ............................... | 701/209 |
| 2007/0250258 A1* | 10/2007 | Hager | ........................... | 701/201 |
| 2008/0030376 A1* | 2/2008 | Tunnell et al. | ............... | 340/988 |
| 2008/0125958 A1* | 5/2008 | Boss et al. | ..................... | 701/123 |

* cited by examiner

*Primary Examiner* — Muhammad Shafi

(74) *Attorney, Agent, or Firm* — Leydig, Voit & Mayer, Ltd.

(57) ABSTRACT

A commuter route learning program learns a telematics subscriber's common travel routes (e.g. work-home, home-school, etc.) and offers traffic reports based on the routes. In one aspect, three modes are used to establish routes and offer traffic reports. These modes include a Learn Mode during which the commuter route learning program learns new commuter trips, a Pattern Recognition Mode during which the commuter route learning program recognizes and categorizes routes from patterns of trips, and an Execution Mode during which the commuter route learning program automatically provides commuter route traffic congestion information to a subscriber.

8 Claims, 9 Drawing Sheets

COMMUTER ROUTE LEARNING

BACKGROUND OF THE INVENTION

One of the fastest growing areas of communications technology is related to automobile network solutions. Almost all new American cars will have some level of telematics service, and with the increasing number and variety of these services, demands on telematics service call centers have also grown.

One of the primary uses for in-vehicle telematics services is vehicle navigation. In particular, when properly configured and operated, such units may provide vehicle location, directional guidance, and/or traffic condition information. With respect to traffic conditions in particular, a telematics subscriber may input certain commands to retrieve traffic congestion information. Traditionally, a subscriber may retrieve traffic congestion information within a radial proximity of the vehicle location (e.g. 5, 10, 25, 50 miles). In addition, a subscriber may manually configure a route within a subscriber profile, e.g., on the telematics service provider's website, and then later retrieve traffic congestion information when in the vehicle.

It will be appreciated that this Background discussion is not intended to imply that all implementations of the invention must solve a problem exhibited by a prior system, nor is it intended to imply that any particular feature discussed above is in fact prior art. Rather, the Background is a discussion of certain modes of operation known to the inventors, whether prior art or not, while the remaining discussion will focus on additional or alternative mechanisms. Moreover, this disclosure may contain critical observations with respect to certain features or aspects, however these observations are intended to indicate a degree of preference, not to exclude any such less preferred feature from the scope of the invention entirely unless otherwise indicated by context.

BRIEF SUMMARY OF THE INVENTION

A commuter route learning program learns a telematics subscriber's common travel routes (e.g. from work to home, from home to school, etc.) and then automatically offers traffic reports based on the learned routes. Although not invariably required, one contemplated implementation uses three distinct modes of operation to establish routes and offer traffic reports. These modes include a Learn Mode during which the telematics device learns new commuter trips, a Pattern Recognition Mode during which the telematics device recognizes and categorizes routes from patterns of trips, and an Execution Mode during which the telematics device automatically provides commuter route traffic congestion information through a voice activation system. Although these modes are distinct, they may at times operate in a simultaneous or overlapping manner with respect to one or multiple routes.

BRIEF DESCRIPTION OF THE SEVERAL VIEWS OF THE DRAWING(S)

DETAILED DESCRIPTION OF THE INVENTION

Before describing the invention in detail, an exemplary environment in which the invention may operate will be described. It will be appreciated that the described environment is for purposes of illustration only, and does not imply any limitation regarding the use of other environments to practice the invention.

Figure 1:
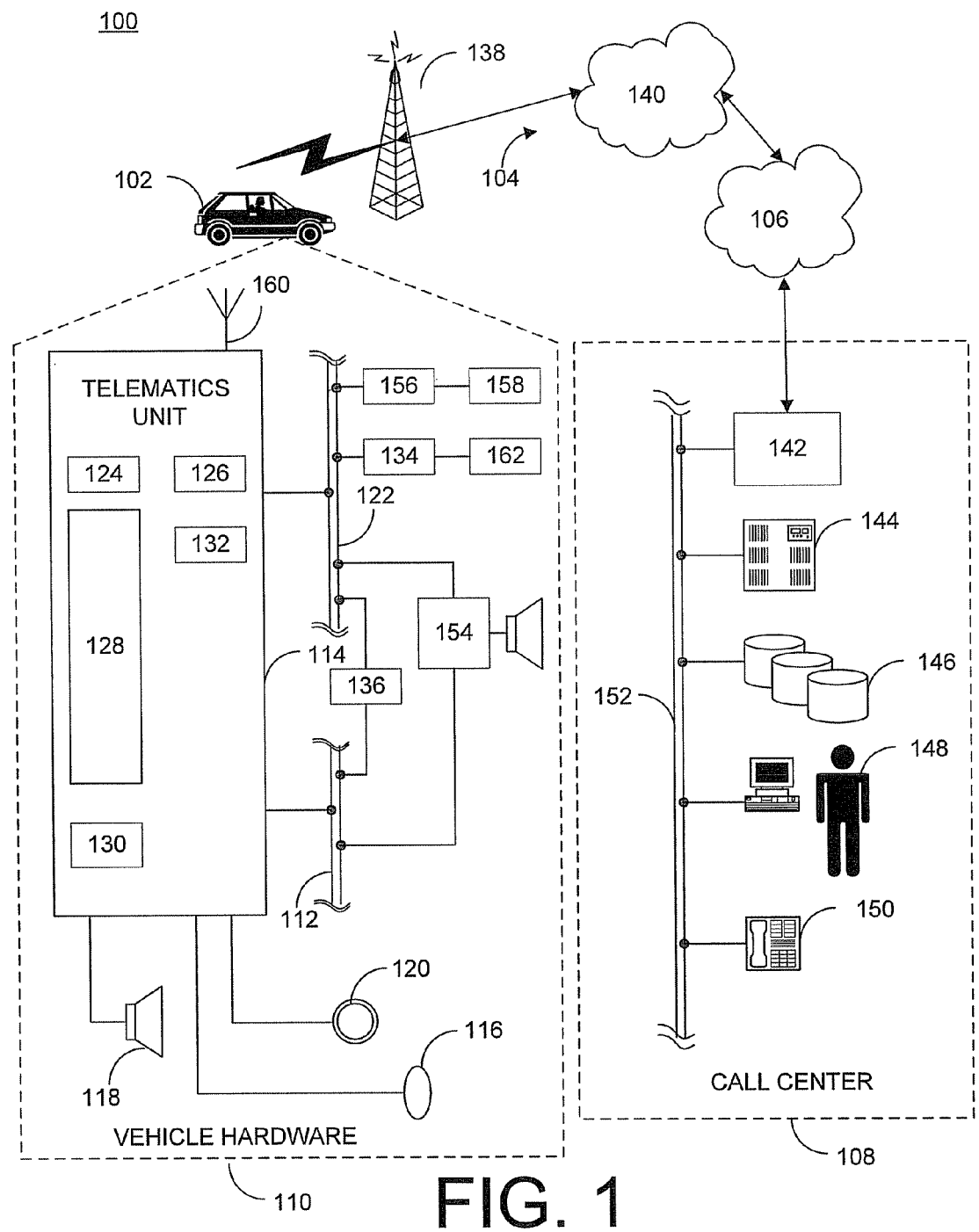
FIG. 1 is a schematic view of an example communication system within which examples of the present invention may be implemented.

With reference to FIG. 1 there is shown an example of a communication system 100 that may be used with the present method and generally includes a vehicle 102, a wireless carrier system 104, a land network 106 and a call center 108. It should be appreciated that the overall architecture, setup and operation, as well as the individual components of a system such as that shown here are generally known in the art. Thus, the following paragraphs simply provide a brief overview of one such exemplary information system 100; however, other systems not shown here could employ the present method as well.

Vehicle 102 is preferably a mobile vehicle such as a motorcycle, car, truck, recreational vehicle (RV), boat, plane, etc., and is equipped with suitable hardware and software that enables it to communicate over system 100. Some of the vehicle hardware 110 is shown generally in FIG. 1 including a telematics unit 114, a microphone 116, a speaker 118 and buttons and/or controls 120 connected to the telematics unit 114. Operatively coupled to the telematics unit 114 is a network connection or vehicle bus 122. Examples of suitable network connections include a controller area network (CAN), a media oriented system transfer (MOST), a local interconnection network (LIN), an Ethernet, and other appropriate connections such as those that conform with known ISO, SAE, and IEEE standards and specifications, to name a few.

The telematics unit 114 is an onboard device that provides a variety of services through its communication with the call center 108, and generally includes an electronic processing device 128 one or more types of electronic memory 130, a cellular chipset/component 124, a wireless modem 126, a dual antenna 160 and a navigation unit containing a GPS chipset/component 132. In one example, the wireless modem 126 is comprised of a computer program and/or set of software routines executing within processing device 128.

The telematics unit 114 provides too many services to list them all, but several examples include: turn-by-turn directions and other navigation-related services provided in conjunction with the GPS based chipset/component 132; airbag deployment notification and other emergency or roadside assistance-related services provided in connection with various crash and or collision sensor interface modules 156 and sensors 158 located throughout the vehicle. Infotainment-related services where music, Web pages, movies, television programs, video games and/or other content is downloaded by an infotainment center 136 operatively connected to the telematics unit 114 via vehicle bus 122 and audio bus 112. In one example, downloaded content is stored for current or later playback.

Again, the above-listed services are by no means an exhaustive list of all the capabilities of telematics unit 114, as should be appreciated by those skilled in the art, but are simply an illustration of some of the services that the telematics unit is capable of offering. It is anticipated that telematics unit 114 include a number of known components in addition to those listed above.

Vehicle communications preferably use radio transmissions to establish a voice channel with wireless carrier system 104 so that both voice and data transmissions can be sent and received over the voice channel. Vehicle communications are enabled via the cellular chipset/component 124 for voice communications and a wireless modem 126 for data transmission. In order to enable successful data transmission over the voice channel, wireless modem 126 applies some type of encoding or modulation to convert the digital data so that it can communicate through a vocoder or speech codec incorporated in the cellular chipset/component 124. Any suitable encoding or modulation technique that provides an acceptable data rate and bit error can be used with the present method. Dual mode antenna 160 services the GPS chipset/component and the cellular chipset/component.

Microphone 116 provides the driver or other vehicle occupant with a means for inputting verbal or other auditory commands, and can be equipped with an embedded voice processing unit utilizing a human/machine interface (HMI) technology known in the art. Conversely, speaker 118 provides verbal output to the vehicle occupants and can be either a stand-alone speaker specifically dedicated for use with the telematics unit 114 or can be part of a vehicle audio component 154. In either event, microphone 116 and speaker 118 enable vehicle hardware 110 and call center 108 to communicate with the occupants through audible speech. The vehicle hardware also includes one or more buttons or controls 120 for enabling a vehicle occupant to activate or engage one or more of the vehicle hardware components 110. For example, one of the buttons 120 can be an electronic push button used to initiate voice communication with call center 108 (whether it be a live advisor 148 or an automated call response system). In another example, one of the buttons 120 can be used to initiate emergency services.

The audio component 154 is operatively connected to the vehicle bus 122 and the audio bus 112. The audio component 154 receives analog information, rendering it as sound, via the audio bus 112. Digital information is received via the vehicle bus 122. The audio component 154 provides AM and FM radio, CD, DVD, and multimedia functionality independent of the infotainment center 136. Audio component 154 may contain a speaker system, or may utilize speaker 118 via arbitration on vehicle bus 122 and/or audio bus 112.

The vehicle crash and/or collision detection sensor interface 156 are operatively connected to the vehicle bus 122. The crash sensors 158 provide information to the telematics unit via the crash and/or collision detection sensor interface 156 regarding the severity of a vehicle collision, such as the angle of impact and the amount of force sustained.

Vehicle sensors 162, connected to various sensor interface modules 134 are operatively connected to the vehicle bus 122. Example vehicle sensors include but are not limited to gyroscopes, accelerometers, magnetometers, emission detection and/or control sensors, and the like. Example sensor interface modules 134 include power train control, climate control, and body control, to name but a few.

Wireless carrier system 104 is preferably a cellular telephone system or any other suitable wireless system that transmits signals between the vehicle hardware 110 and land network 106. According to an example, wireless carrier system 104 includes one or more cell towers 138, base stations and/or mobile switching centers (MSCs) 140, as well as any other networking components required to connect the wireless system 104 with land network 106. A component in the mobile switching center may include a remote data server 180. As appreciated by those skilled in the art, various cell tower/base station/MSC arrangements are possible and could be used with wireless system 104. For example, a base station and a cell tower could be co-located at the same site or they could be remotely located, and a single base station could be coupled to various cell towers or various base stations could be coupled with a single MSC, to but a few of the possible arrangements. Preferably, a speech codec or vocoder is incorporated in one or more of the base stations, but depending on the particular architecture of the wireless network, it could be incorporated within a Mobile Switching Center or some other network components as well.

Land network 106 can be a conventional land-based telecommunications network that is connected to one or more landline telephones and connects wireless carrier network 104 to call center 108. For example, land network 106 can include a public switched telephone network (PSTN) and/or an Internet protocol (IP) network, as is appreciated by those skilled in the art. Of course, one or more segments of the land network 106 can be implemented in the form of a standard wired network, a fiber or other optical network, a cable network, other wireless networks such as wireless local networks (WLANs) or networks providing broadband wireless access (BWA), or any combination thereof.

Call Center (OCC) 108 is designed to provide the vehicle hardware 110 with a number of different system back-end functions and, according to the example shown here, generally includes one or more switches 142, servers 144, databases 146, live advisors 148, as well as a variety of other telecommunication and computer equipment 150 that is known to those skilled in the art. These various call center components are preferably coupled to one another via a network connection or bus 152, such as the one previously described in connection with the vehicle hardware 110. Switch 142, which can be a private branch exchange (PBX) switch, routes incoming signals so that voice transmissions are usually sent to either the live advisor 148 or an automated response system, and data transmissions are passed on to a modem or other piece of equipment 150 for demodulation and further signal processing. The modem 150 preferably includes an encoder, as previously explained, and can be connected to various devices such as a server 144 and database 146. For example, database 146 could be designed to store subscriber profile records, subscriber behavioral patterns, or any other pertinent subscriber information. Although the illustrated example has been described as it would be used in conjunction with a manned call center 108, it will be appreciated that the call center 108 can be any central or remote facility, manned or unmanned, mobile or fixed, to or from which it is desirable to exchange voice and data.

A telematics unit contains a voice activation system allows a telematics subscriber to retrieve traffic congestion information. Traditionally, a subscriber may retrieve traffic congestion information within a radial proximity of the vehicle location (e.g. 5, 10, 25, 50 miles). In addition, a subscriber may configure a commute route within the subscriber's commute profile on a telematics service provider's website, and then retrieve traffic congestion information when in the vehicle through a voice activation system. The commuter route learning program allows a subscriber to retrieve traffic congestion information for a commute route without configuring it to a commute profile on a telematics service provider's website.

Figure 2:
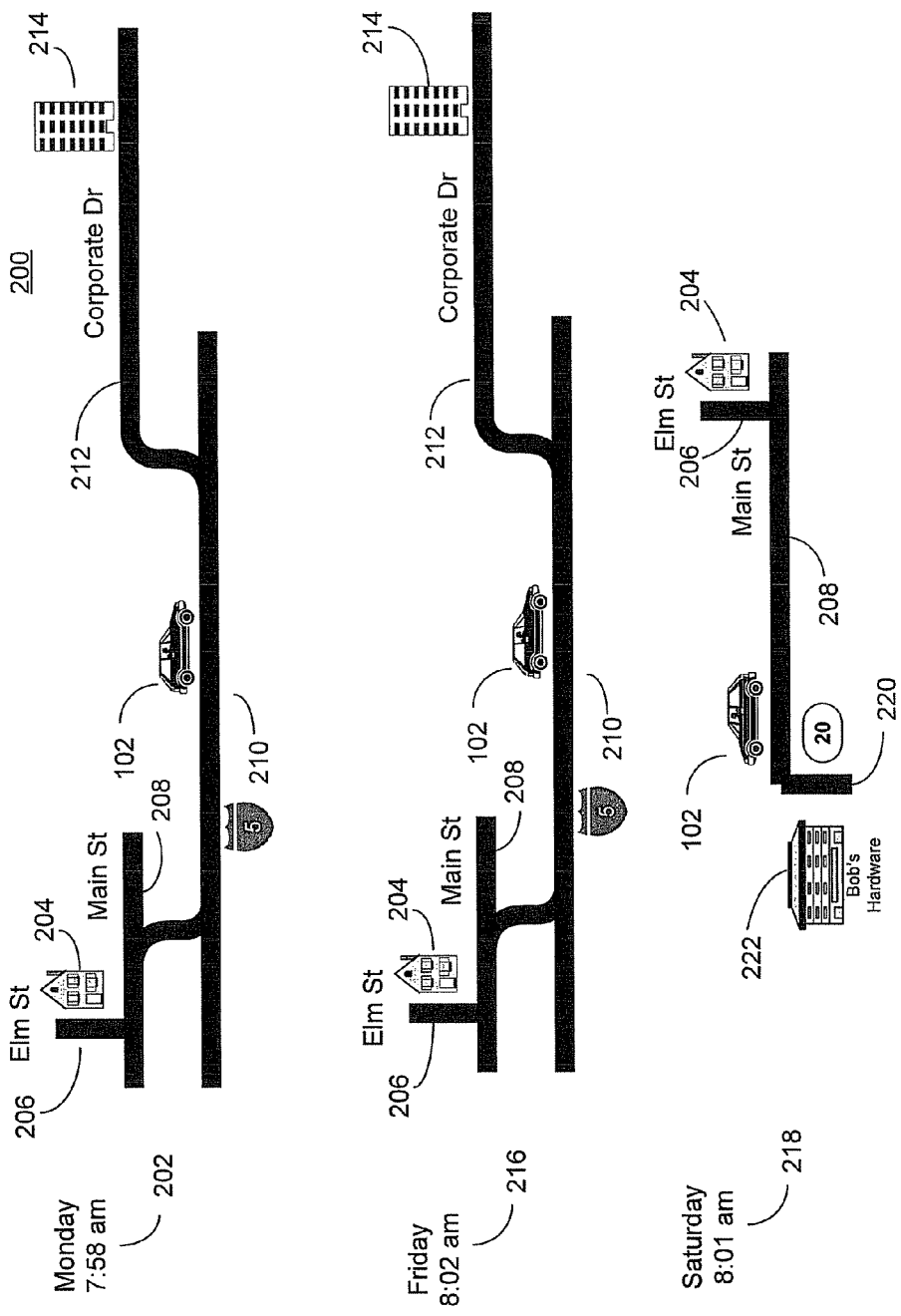
FIG. 2 is a trip diagram illustrating an implementation of many features of the disclosed principles.

The program learns different commuter routes for a telematics subscriber. The commuter learning program is implemented by the telematics unit's CPU 128 and may be stored in the telematics unit's memory. The steps and processes described hereinafter are executed by the commuter learning program unless otherwise indicated or implied by context. FIG. 2 is a trip diagram 200 illustrating the learning of a route. In the illustrated example, it is assumed that a subscriber in a telematics unit-equipped vehicle 102 leaves for work every weekday morning at about 8 am, as shown in scenarios 202 and 216. The subscriber's trip to the office 214 includes leaving home 204 and turning south on Elm St. 206. Next, the subscriber turns east on Main St 208 and enters Interstate Highway 5 (210). As the trip continues, the subscriber exits I-5 (210) and turns east on Corporate Dr 212 to reach his place of employment 214.

As noted in overview above, the commuter learning program learns the subscriber's work route and provides the subscriber with traffic reports on the route by implementing three modes. These modes include a Learn Mode during which the commuter learning program learns new commuter trips, a Pattern Recognition Mode during which the commuter learning program recognizes and categorizes routes from patterns of trips, and an Execution Mode during which the commuter learning program automatically provides commuter route traffic congestion information.

A "trip" is generally considered herein to encompass a vehicle's journey from turning the on of the vehicle ignition to the turning off of the vehicle ignition. For example, a route may be indicated by a number of repetitive trips occurring at substantially the same time on consecutive weekdays and/or weekend days. The number of repetitive trips required to establish a route is three in one contemplated implementation, but any other number may be used according to usage environment and designer preferences. Alternatively, the telematics provider may configure the commuter route learning program to use a particular number of trips to establish a route. Thus, if a subscriber repeatedly travels a given route at substantially the same time every Saturday, a new route may be learned by the program. For example, a subscriber may work a weekend job at a local hardware store. The subscriber may commute every Saturday, as in scenario 222, from home 204, by truing south on Elm St. 206, turning west on Main St 208, and turning south on State Route 20 (220) to the hardware store (222).

Figure 3:
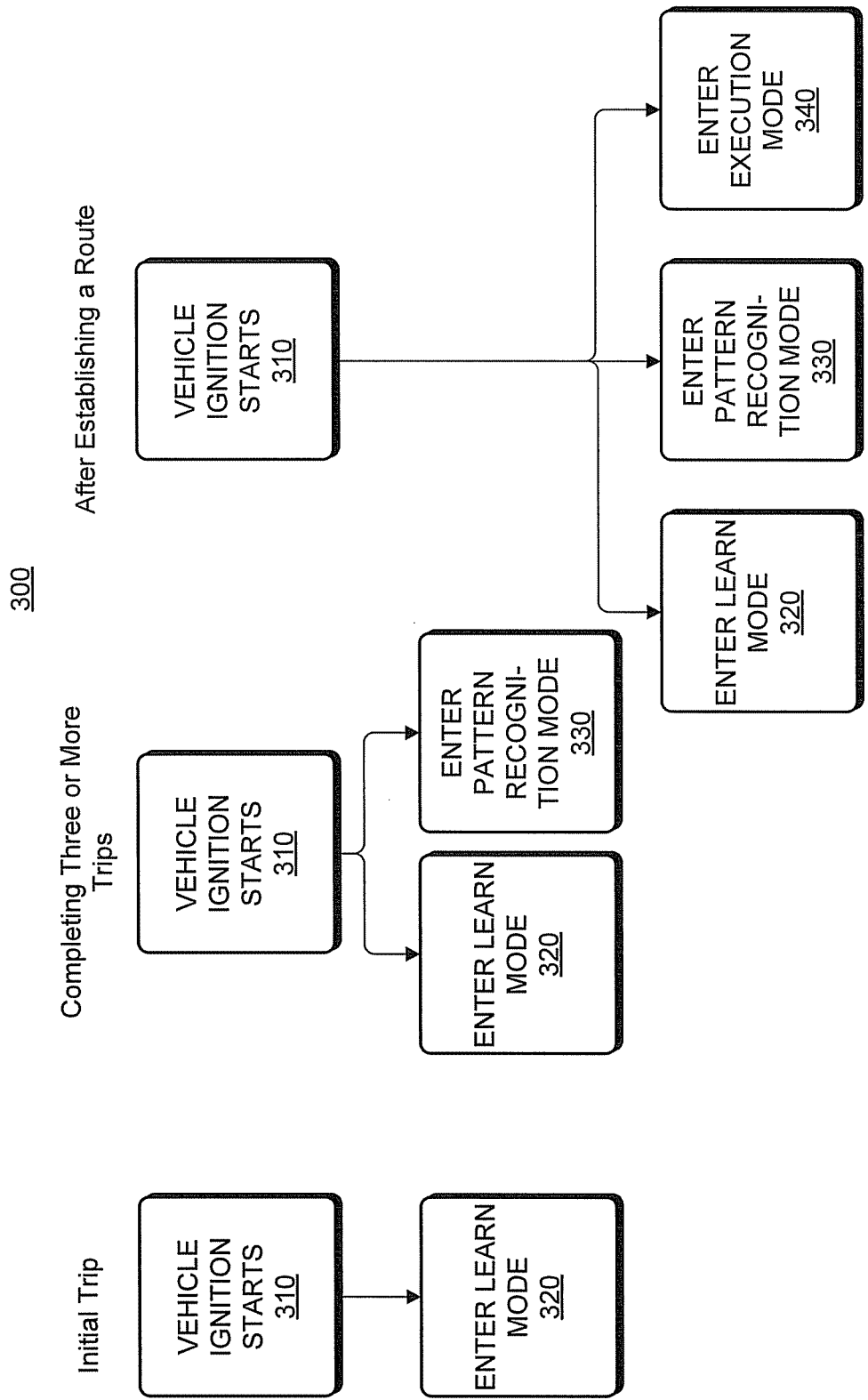
FIG. 3 is a flow diagram that illustrates an exemplary manner of operation in accordance with the disclosed principles.

FIG. 3 is a flow diagram 300 that illustrates in overview an exemplary method of executing route learning and processing in accordance with the disclosed principles. In an example, the commuter learning program resides in the memory 130 of the telematics unit 114 and is implemented by the telematics unit's central processing unit 128. When the telematics unit 114 is powered on upon the starting of the vehicle ignition at stage 310, the commuter learning program enters a Learn Mode in stage 320 to track the initial trip of the vehicle. The Pattern Recognition Mode of the commuter learning program establishes a commuter route after analyzing and determining a predetermined number, e.g., three, of repetitive trips.

Thus, after completing three trips in the illustrated example, when the vehicle ignition starts in stage 310, the program enters Learn Mode at stage 320 and Pattern Recognition Mode at stage 330 simultaneously. After the Pattern Recognition Mode establishes a route, the next time the vehicle starts its ignition 310, the program simultaneously runs in Learn Mode 320, Pattern Recognition Mode 330, and Execution Mode 340. While in Execution Mode, the program may offer a subscriber a traffic report.

Figure 4:
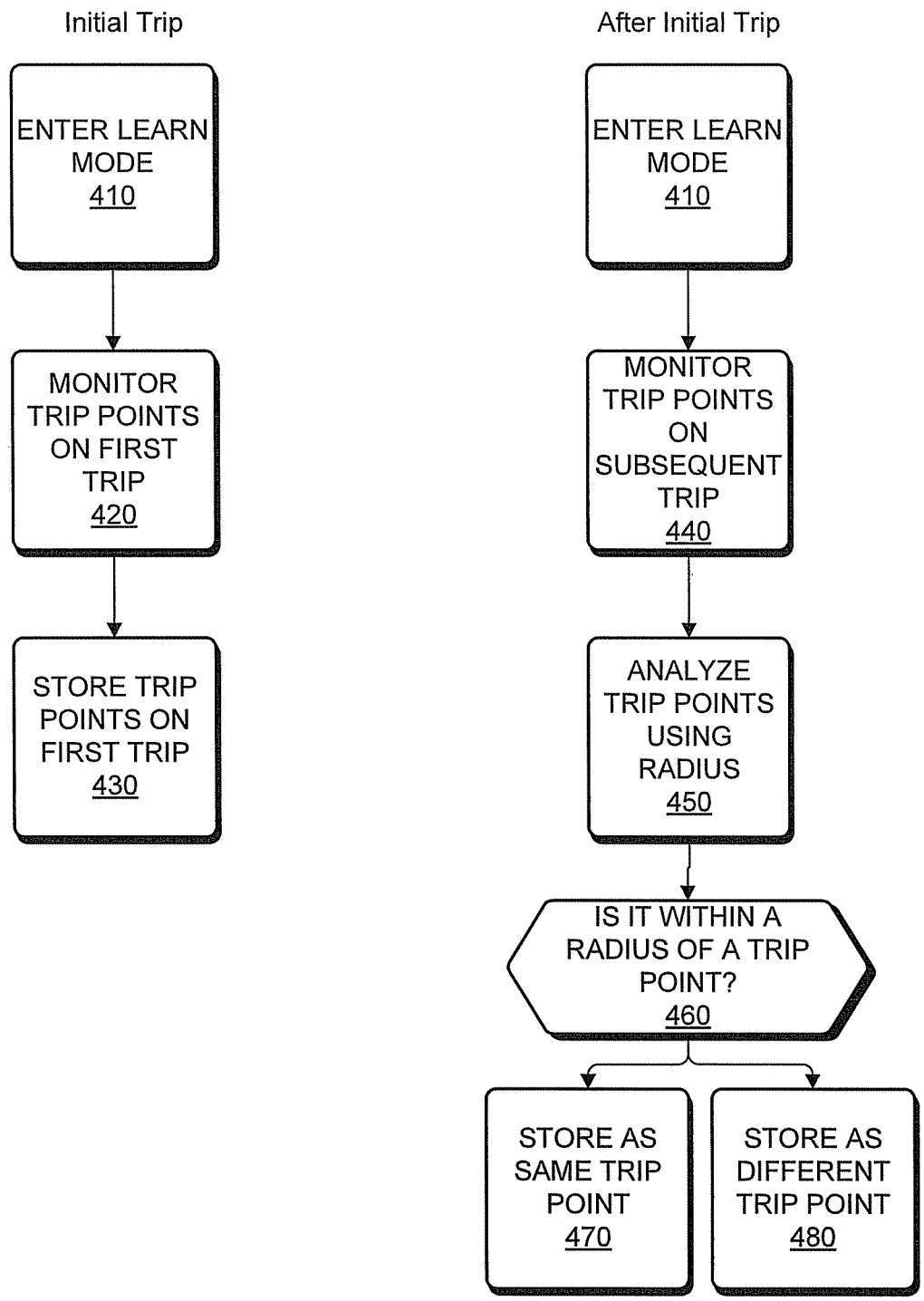
FIG. 4 is a flow diagram illustrating an exemplary manner of operation during a Learn Mode.

FIG. 4 is a flow diagram 400 illustrates an exemplary method of executing the Learn Mode. When the telematics unit 114 is powered on upon the starting of the vehicle ignition at stage 310, the commuter learning program enters a Learn Mode at stage 410. At a next stage 420, the program monitors trip points. Trip points are vehicle positions, e.g., resolved via GPS, at predetermined intervals of time (e.g. 15 seconds) and/or distance (e.g. 300 feet) and/or events (e.g., direction change). At a next stage 430, the program stores the trip points into the telematics unit's memory.

After the initial trip, when the subscriber starts the vehicle ignition, the program again enters Learn Mode 410. At a next stage 440 the program monitors trip points as discussed above. At a next stage 450, the program analyzes each monitored trip point using a predetermined radius (e.g., in time and/or distance) about the corresponding originally stored trip point to determine the current point's difference from the corresponding originally stored trip point.

At a next stage 460, the program determines whether the monitored trip point is within the specified radius of the originally stored trip point. If it is determined that the monitored trip point is within the specified radius of the originally stored trip point, then at a next stage 470 the monitored trip point is stored as the same trip point as the originally stored trip point. This allows for a reduction of data storage, saving the telematics unit's memory. If the monitored trip point is outside the specified radius, then at a next stage 480 the monitored trip point is stored as a different trip point. Trip points are stored, for example, by GPS location, time of day, and day of week. A trip, which is a collection of trip points between ignition on and off, may be stored with the length of trip, and the start and end points of the trip.

Figure 5:
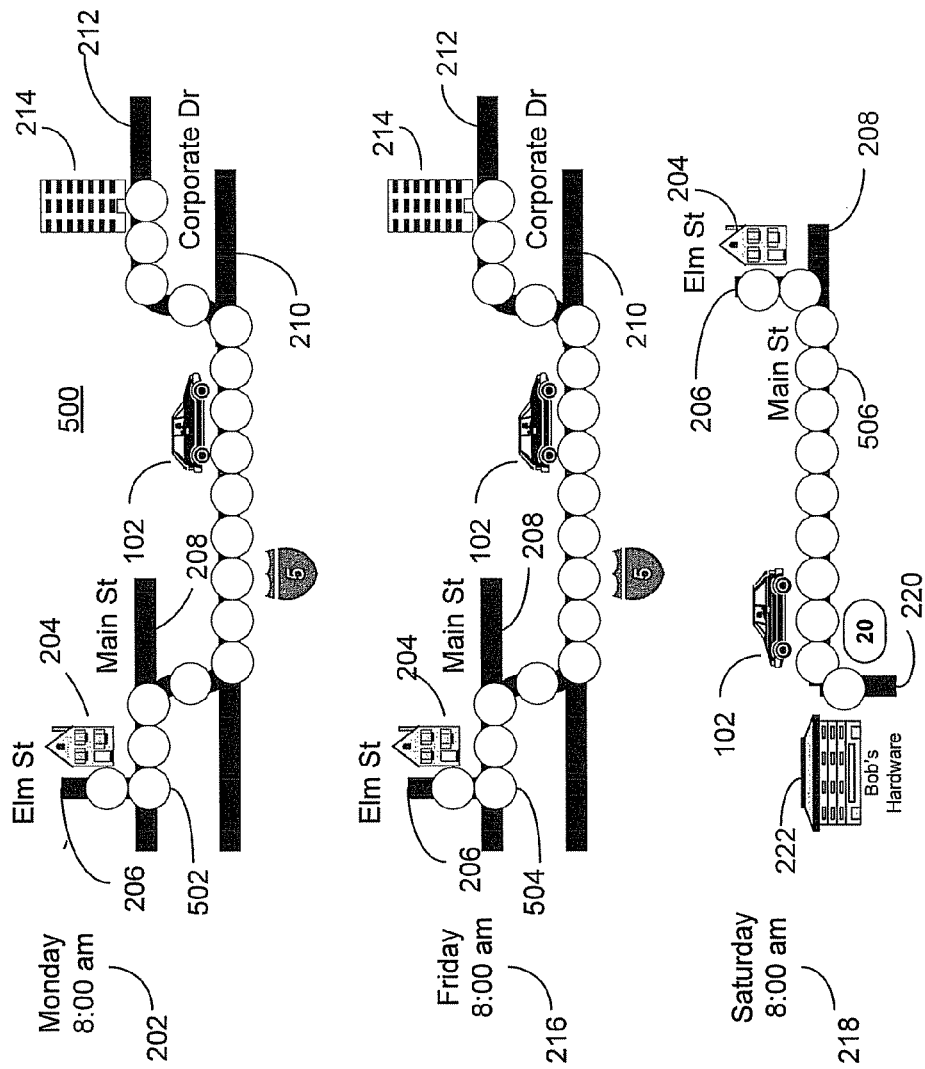
FIG. 5 is a trip diagram illustrating a process for automatically learning a route.

FIG. 5 is a trip diagram 500 illustrating trip points and corresponding radii. The center of each circle (502, 504) on a subscriber work route represents a trip point. For example, on Monday 7:58 am 202 may be the program's initial trip. At a specified intervals, the program records a trip point. On Friday 8:02 am 216, the program may be on a subsequent trip. Every trip point 504 may be within the specified radius of ever trip point from Monday's trip 502. Thus, each trip point is recorded as the same trip point to reduce the quantity of stored data on the telematics unit. However, on Saturday 8:00 am 218, the program records every monitored trip point 506 as a different trip point because the subscriber is traveling on a different trip.

Figure 6:
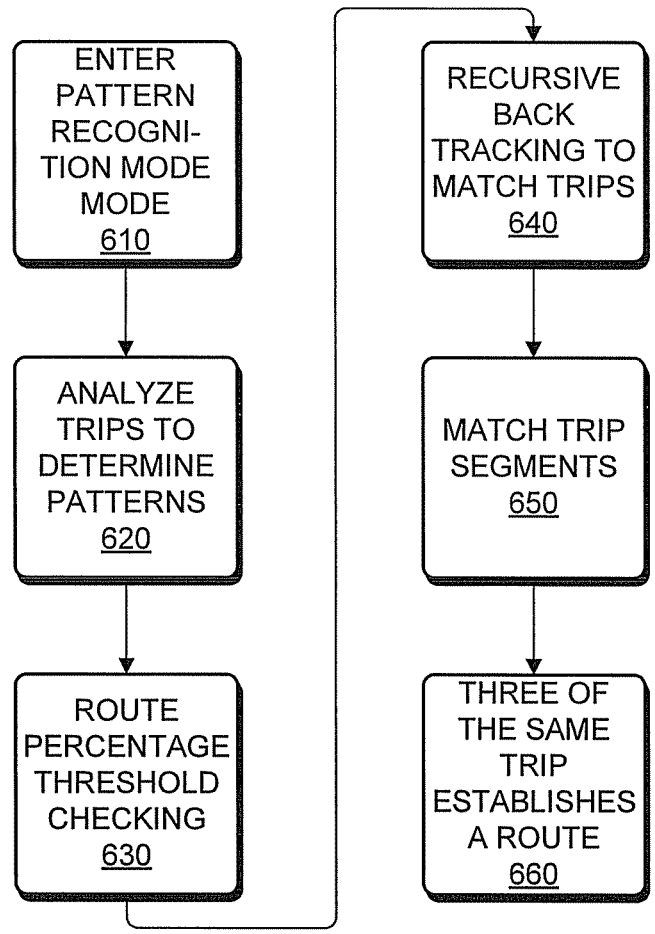
FIG. 6 is a flow diagram illustrating an exemplary manner of operation during a Pattern Recognition Mode.

FIG. 6 is a flow diagram 600 of a process for operating within the Pattern Recognition Mode in one example. For example, after three or more completed trips, during the subsequent trip, the program may enter a Pattern Recognition Mode at stage 610. At a next stage 620, the program analyzes the three or more recorded trips to determine any patterns to establish a route. In this example, a route is established when there are three or more repetitive trips recorded by the program. The number three is arbitrary in this example, and may be any number considered necessary to establish a route by the telematics service provider. While in Pattern Recognition Mode, the computer learning program may analyze repetitive trips in several different ways. For example, at a next stage 630, the program may implement Route Percentage Threshold Checking wherein trips with the same start and end point, and a certain percentage of common trip points are considered the same. For example, a trip with the same start and end points and sharing 90% of their trip points in common may be considered to be the same trip.

At a next stage 640, the program may implement Recursive Back Tracking to match trips. This technique determines whether trips are the same by comparing them from day to day during weekdays and also week to week during weekdays. This allows for commute patterns to be recognized for part-time workers or subscribers that travel to two different offices on a regular basis. At a next stage 660, the program matches trip segments to determine a repetitive trip. That is, the program determines a repetitive trip by concatenating two trip segments to one long trip using time of ignition on and off in combination with matching origin and destination trip points. If the program determines three repetitive trips, that trip is established as a route.

Figure 7:
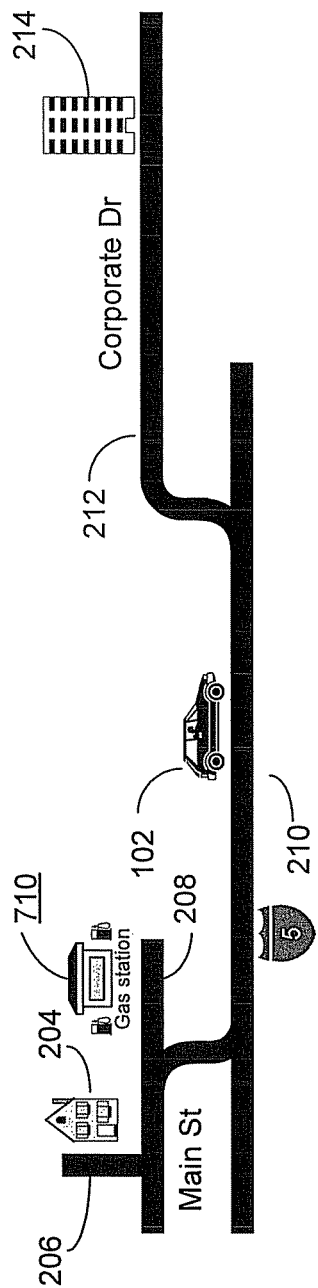
FIG. 7 is a trip diagram illustrating an example of the invention matching trip segments.

FIG. 7 is a route diagram providing an example 700 of matching trip segments for a subscriber that may stop at a gas station 710 on the way to work. In this example, two trips may be recorded. A short trip from the subscriber's home 204 to the gas station 710, and a long trip from the gas station 710 to the office 214. The program in Pattern Recognition Mode matches these two trips to be the same as a home-office trip by first concatenating the two shorter trip segments (home-gas station, gas-station-work) due to matching origin and destination points of the two trips, and then determining a threshold number of common points between concatenated trip and the home-office trip.

Figure 8:
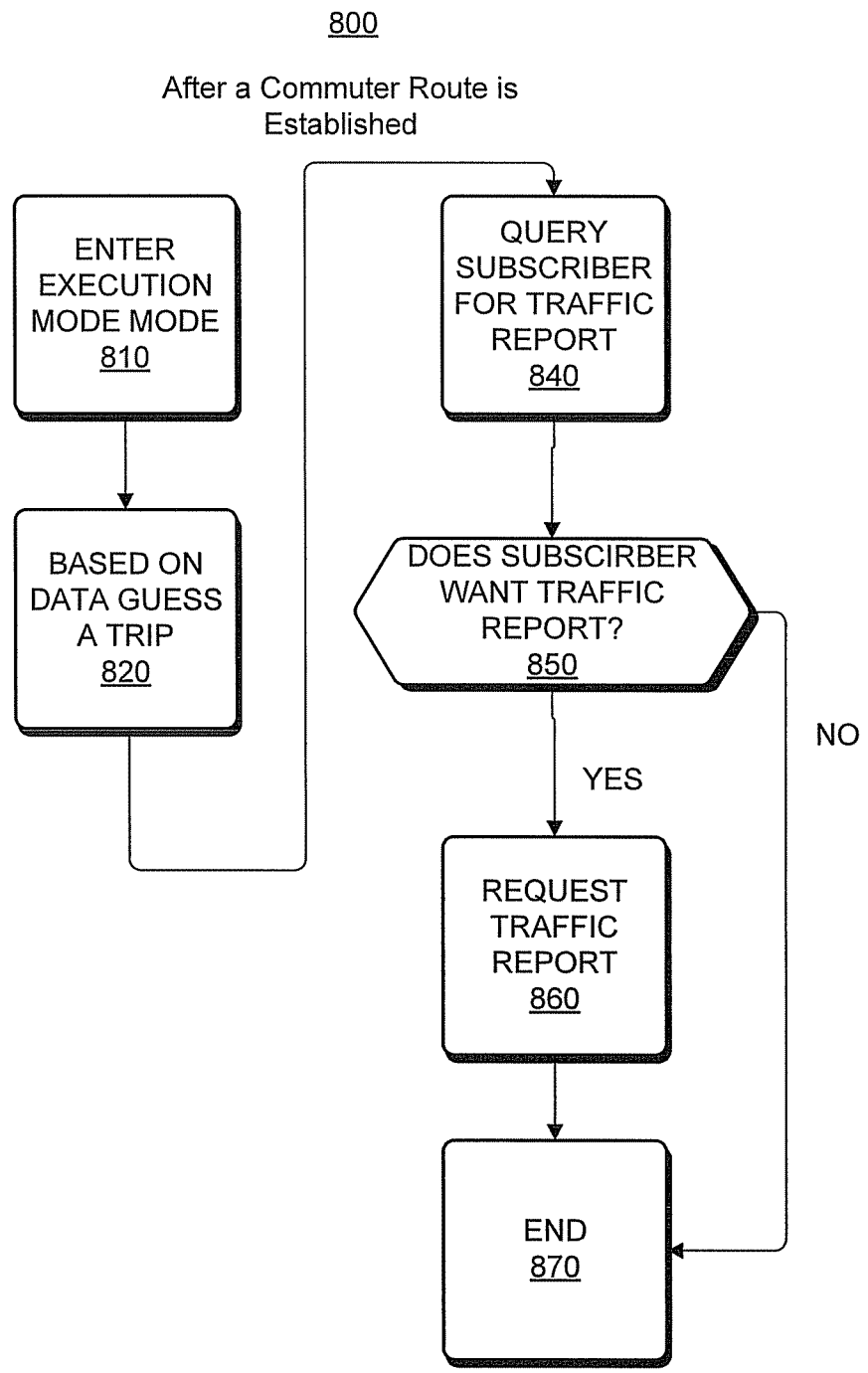
FIG. 8 is a flow diagram illustrating an exemplary manner of operation during an Execution Mode.

FIG. 8 is a flow diagram 800 of an exemplary method of the Execution Mode of a contemplated implementation. The program enters Execution Mode at stage 810 after it has established a route from recording previous trips. At a next stage 820, if a subscriber turns the vehicle ignition on at around 8 am (with a tolerance of predetermined amount, e.g., 5 or 15 minutes) from home, then based on this data the program assumes that subscriber may travel an established route. The program then queries the subscriber as to whether she desires a traffic report for the route at stage 840. At a next stage 850, the program determines whether the subscriber desires a traffic report. If not, at a next stage 870, Execution Mode ends. However, if the subscriber desires a traffic report, then at stage 860, the program requests a traffic report from the database of the telematics service provider over a wireless network and presents the traffic report to the subscriber. The traffic report may be represented by reporting traffic incidents around a certain radius of each trip point.

Figure 9:
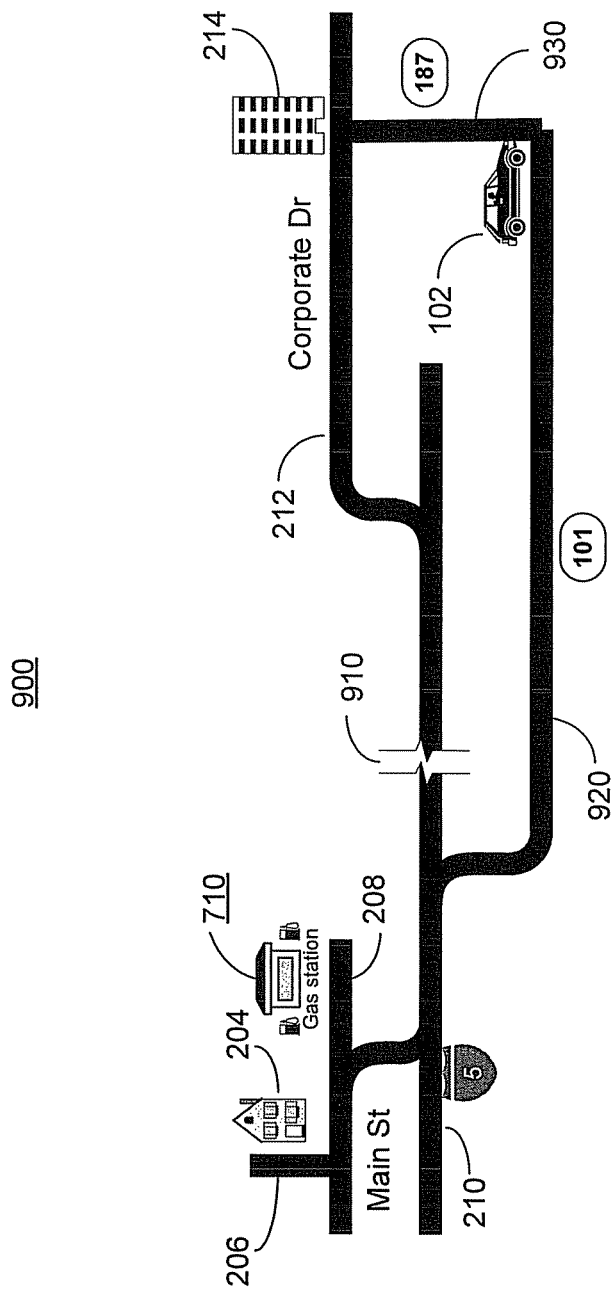
FIG. 9 is a trip diagram illustrating the establishment of an alternative route in accordance with the disclosed principles.

The commuter route learning program allows for the telematics unit to learn multiple routes and for a subscriber to receive traffic reports for more than one route. For example, in FIG. 9, a subscriber's normal work route is detoured because of a road break 910. Thus, the subscriber, may travel from I-5 to Highway 101 (920), then to Highway 187 (930) to the office 214. After repeating this trip for at least three or more times (by way of example), the program learns the alternative work route and may offer the new route to the subscriber when in a subsequent Execution Mode. If the road break 910 is no longer applicable, and if the subscriber re-traverses the normal work route, the route learning program will recognize the work route as a previously learned route for the subscriber to receive traffic reports.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred examples of this invention are described herein, including the best mode known to the inventors for carrying out the invention. Variations of those preferred examples may become apparent to those of ordinary skill in the art upon reading the foregoing description. The inventors expect skilled artisans to employ such variations as appropriate, and the inventors intend for the invention to be practiced otherwise than as specifically described in the examples herein.

Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method for providing traffic information for a commuter route to a user via a telematics unit associated with a subscriber vehicle, the method comprising:
    instantiating, by the telematics unit, a commuter route learning application;
    observing by the telematics unit, driving of the subscriber vehicle and recording a plurality of trips taken in the subscriber vehicle, each of the plurality of trips including a plurality of trip points;
    determining, by the telematics unit, a route from the recorded plurality of trips, wherein the determining comprises analyzing the trip points of the plurality of recorded trips to identify repetitive trips corresponding to the route and to identify time of day and day of week information corresponding to the route, wherein the analyzing includes matching multiple trips having the same start and end trip points and further having at least a threshold amount of common trip points;
    identifying, by the telematics unit, the route to the user based on comparing current time of day and day of week information when vehicle ignition is turned on to the time of day and day of week information corresponding to the route; and
    requesting, by the telematics unit, a traffic report comprising traffic information for the route, and receiving the traffic report comprising traffic information for the route; and
    providing, by the telematics unit, at least a portion of the received traffic report to the user.

2. The method according to claim 1, wherein observing driving of the subscriber vehicle and recording a plurality of trips taken in the subscriber vehicle comprises:

identifying a plurality of trip points along each trip at a specified interval;

storing calculated trip points in a memory of the telematics unit; and analyzing each stored trip point to determine whether it is the same as a previously identified trip point.

3. The method according to claim 2, wherein trip points are recorded using a global positioning system.

4. The method according to claim 1, wherein analyzing the plurality of recorded trips comprises checking a number of common trips points between trips.

5. The method according to claim 1, wherein analyzing the plurality of recorded trips includes recursive back tracking.

6. The method according to claim 1, wherein analyzing the plurality of recorded trips comprises:

matching a start trip point of a first trip and an end trip point of a second trip to a start and end point of a third trip;

determining at least one other trip to be concatenated between the first trip and the second trip to produce a concatenated trip; and determining whether the concatenated trip shares at least a threshold number of common trip points with the third trip such that if the concatenated trip shares at least a threshold number of common trip points with the third trip, the concatenated trip and the third trip are determined to be repetitive trips.

7. The method according to claim 1, further comprising comprises:

presenting an identification of the route to the user; and querying the user to determine whether the user desires traffic information for the identified route;

wherein the requesting and receiving the traffic report are in response to receiving a user input indicating that the user desires traffic information for the identified route.

8. The method according to claim 1, wherein a trip is deemed to begin when the vehicle ignition is turned on and to end when the vehicle ignition is turned off.

* * * * *